United States Patent [19]
Abel et al.

[11] Patent Number: 5,467,271
[45] Date of Patent: Nov. 14, 1995

[54] MAPPING AND ANALYSIS SYSTEM FOR PRECISION FARMING APPLICATIONS

[75] Inventors: Robert J. Abel, Newark; Michael C. MacDonald, San Jose; Peter S. Wang, Cupertino, all of Calif.

[73] Assignee: TRW, Inc., Redondo Beach, Calif.

[21] Appl. No.: 169,853

[22] Filed: Dec. 17, 1993

[51] Int. Cl.[6] ............................................. G06F 17/40
[52] U.S. Cl. .................................................... 364/420
[58] Field of Search ........................... 364/420; 250/255; 395/928

[56] References Cited

PUBLICATIONS

S. E. Marsh et al., "Multeemporal analysuis of hazardous waste sites through the use of a new bi–spectral video remote sensing system and standard color photography", Proceedings of the eighth thematic conference on geologic remote sensing, May 2, 1991, pp. 239–252 (Abstract only).

*Primary Examiner*—Donald E. McElheny, Jr.

[57] ABSTRACT

A mapping and analysis system generates agricultural maps and analyzes the agricultural maps to match farm inputs of a farming field to current soil and vegetation characteristics to optimize the productivity of the farming field. The mapping and analysis system includes an air-based device for generating spectral image data related to at least one of vegetation stress and soil characteristics for a portion of the farming field. A position device generates position data related to the position of said air-based device with respect to said portion of the farming field. A georeferencing device synchronizes said position data with said spectral image data to generate georeferenced spectral image data. A database is generated using the georeferenced data to monitor and analyze the farming field for a growing season to improve productivity thereof.

47 Claims, 5 Drawing Sheets

MAPPING AND ANALYSIS SYSTEM FOR PRECISION FARMING APPLICATIONS

BACKGROUND OF THE INVENTION

1. Technical Field

This invention relates to farming and, more particularly, to apparatus and methods for producing georeferenced agricultural maps of farming fields and for analyzing the maps to match farm inputs, such as chemicals and water, to current soil and vegetation characteristics to optimize productivity of the farming field.

2. Discussion

Productivity of agricultural lands has a major impact on the world economy and, as world population increases, this impact will increase substantially. Over the last four decades, productivity has doubled while labor has been reduced by a factor of three. Most of the improved productivity and reduced labor can be attributed to advances in irrigation and harvesting machinery and in improved fertilizing and insecticide chemicals.

Specific soil characteristics can vary significantly within a farming field. Particular regions of the farming field can receive too much or too little fertilizer, water and/or insecticide. Environmental damage can occur due to excess inputs and sub-optimal crop yield can occur in farming regions receiving insufficient farming inputs.

Precision farming has been proposed to provide farming inputs which are varied to match specific soil characteristics of each region of a farming field to prevent environmental damage and to allow crop yield optimization. Conventional chemical spreading machinery can currently spread chemicals at variable rates based upon an input soil map. Similarly, conventional irrigation systems allow chemicals and water to be controlled and varied over time and location based upon an input soil map. However, conventional prescription farming approaches are limited with respect to the type and/or extent of data provided. In other words, current approaches do not generate sufficiently competent data for incorporation into the input soil maps which control the chemical spreading machinery and the irrigation systems.

One approach generates soil maps from aerial photographs. While the photographs provides some indication of soil conditions, little or no information relating to crop development and/or yield is provided. Spectral image data provided is limited and difficult to correlate to quantifiable conditions.

A second approach generates soil maps from manual measurements made using soil probes. The second approach also provide some indication of soil conditions but does not provide information relating to crop development and/or yield. The second approach is labor intensive and provides limited or discrete data samples which do not adequately represent soil and vegetation characteristics.

A third approach, related to the second approach, generates soil maps from "on-the-move" soil probes. While the third approach is more comprehensive than the second approach, similar disadvantages are present. The third approach provides some indication of soil conditions but does not provide information relating to crop development and/or yield. The third approach is similarly labor intensive and provides limited or discrete data samples which, as above, do not adequately represent soil and vegetation characteristics.

A fourth approach generates spectral images or maps from airborne or spaceborne multispectral sensors which generate spectral signals related to soil type and crop stress. Vegetation indices are calculated from the spectral signals generated from a limited number of spectral bands, typically less than four spectral bands.

Data generated using the fourth approach has not been used for generating input soil maps for chemical spreading machinery and/or irrigation systems because the spectral images are not georeferenced and therefore do not provide sufficient precision. The vegetation indices calculated from the spectral signals are not calibrated with nutrient contents of the soil and/or vegetation. Calibrating spectral imagery generated by the fourth approach from day to day has been difficult since the magnitude of spectral reflectance is related to light intensity and atmospheric conditions. As a result, databases which summarize soil and vegetation characteristics and other related data for the farming field have been either unobtainable or imprecise.

Therefore, a precision farming system addressing the above problems is desired.

SUMMARY OF THE INVENTION

A mapping and analysis system according to the invention generates agricultural maps and analyzes the agricultural maps to match farm inputs of a farming field to current soil and vegetation characteristics to optimize the productivity of the farming field. The mapping and analysis system includes an air-based device for generating spectral image data related to at least one of vegetation stress and soil characteristics for a portion of the farming field. A position device generates position data related to the position of said air-based device with respect to said portion of the farming field. A georeferencing device synchronizes said position data with said spectral image data to generate georeferenced spectral image data.

According to one feature of the invention, a database is generated using the georeferenced data to monitor and analyze the farming field for a growing season and over multiple growing seasons to improve productivity thereof.

According to another feature of the invention, ground-based measurements are correlated with georeferenced spectral image data in said database. Over time, data contained in said database allows crop and soil status categories to be determined from said collected and georeferenced spectral image data.

In still another feature of the invention, visualization, image processing, mathematical techniques, and/or adaptive signal processing are used to classify collected georeferenced spectral image data in said crop and soil status categories.

Other objects, features and advantages will be readily apparent.

BRIEF DESCRIPTION OF THE DRAWINGS

The various advantages of the present invention will become apparent to those skilled in the art after studying the following specification and by reference to the drawings in which.

DESCRIPTION OF THE PREFERRED EMBODIMENT

Figure 1:
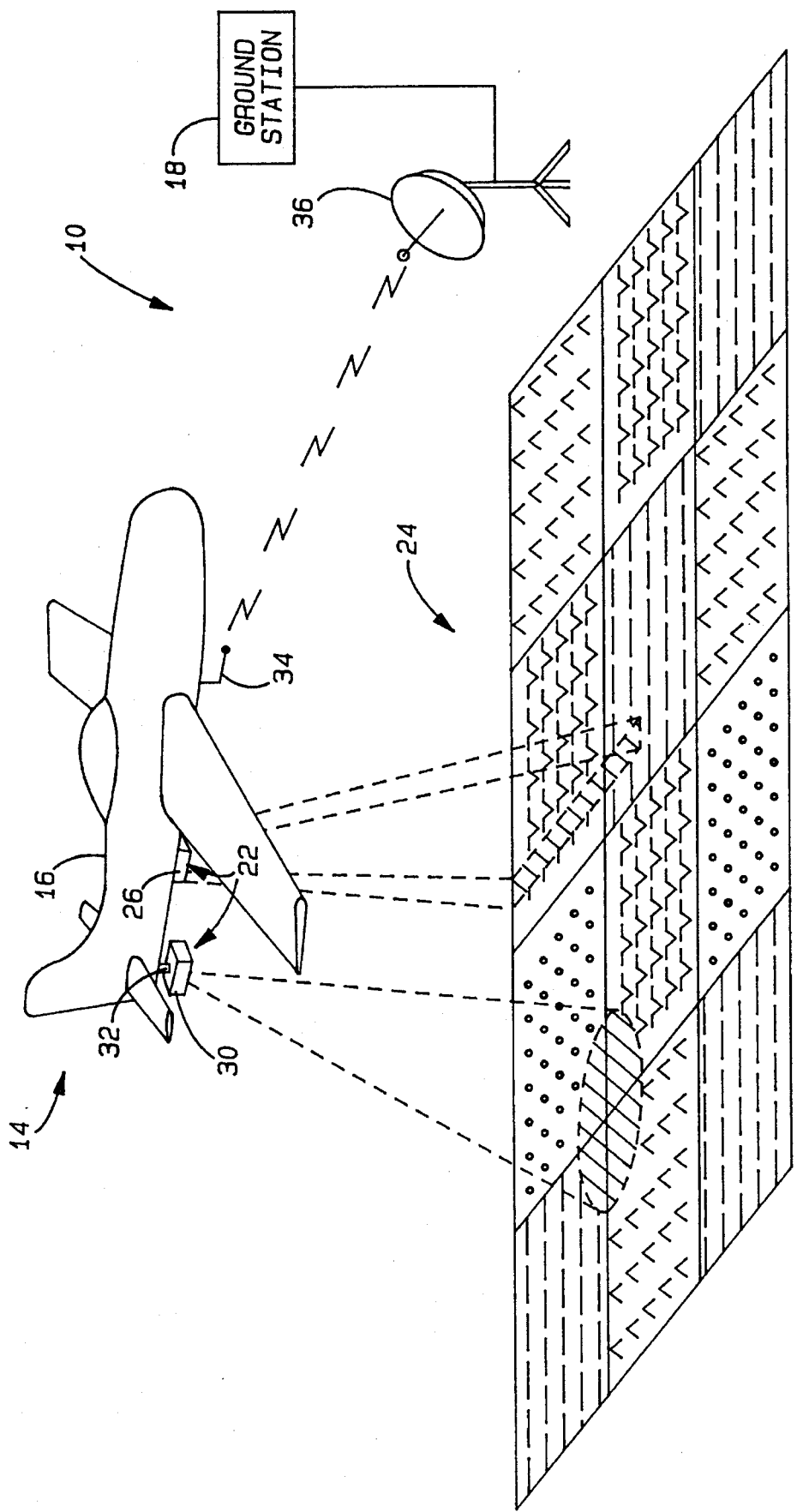
FIG. 1 illustrates a mapping and analysis system including an air-based station and a ground station according to the invention in use over a farming field.

In FIG. 1, a mapping and analysis system 10 for precision farming applications is illustrated and produces agricultural maps for precision farming from a combination of high resolution airborne and ground-based sensors. Mapping and analysis system 10 utilizes databases which include information relating to current as well as prior aerial-based imaging, ground-based imaging, other ground-based sampling, etc. and generates electronic maps or hardcopy reports for use in optimizing productivity, by chemical (for example fertilizer, insecticide, etc.) and/or water distribution control systems, etc.

While mapping and analysis system 10 is described in conjunction with mapping and analyzing productivity of farming fields, one can appreciate that mapping and analysis system 10 has other applications such as monitoring and analyzing wetlands, exploring, evaluating lands containing hazardous materials, land mapping forests and ranges, etc. Other applications will be readily apparent.

Mapping and analysis system 10 includes an air-based station 14 (further illustrated in FIG. 2) carried by an aircraft 16 and a ground-based station 18. While aircraft 16 is shown as an airplane, other aircraft, satellites, etc. are contemplated. Air-based station 14 includes image sensing devices 22 for measuring spatial and spectral resolution data of a farming field 24 under study.

Sensing devices 22 can include an image spectrometer 26 which collects spectral image data across a wide spectrum and a camera 30 for providing visual images of farming field 24 under study. Preferably camera 30 is a high resolution color and/or thermal imaging camera. For purposes of flexibility, the camera 30 can be attached to aircraft 14 using a steerable mount 32. Spectrometer 26 can also include a steerable mount. Air-based station 14 can communicate with ground-based station 18 using a transmit/receive antenna 34.

Many techniques for remote characterization of crops and soil have been developed, for example "Remote Sensing of Vegetation Characteristics for Farm Management", Volume 475, Society of Photo-Optical Instrumentation Engineers, pp. 81–96 (1984), hereby incorporated by reference. Apparatus for spreading fertilizer based upon digitized maps have been developed and described in U.S. Pat. No. 4,630,773 to Ortlip.

Figure 2:
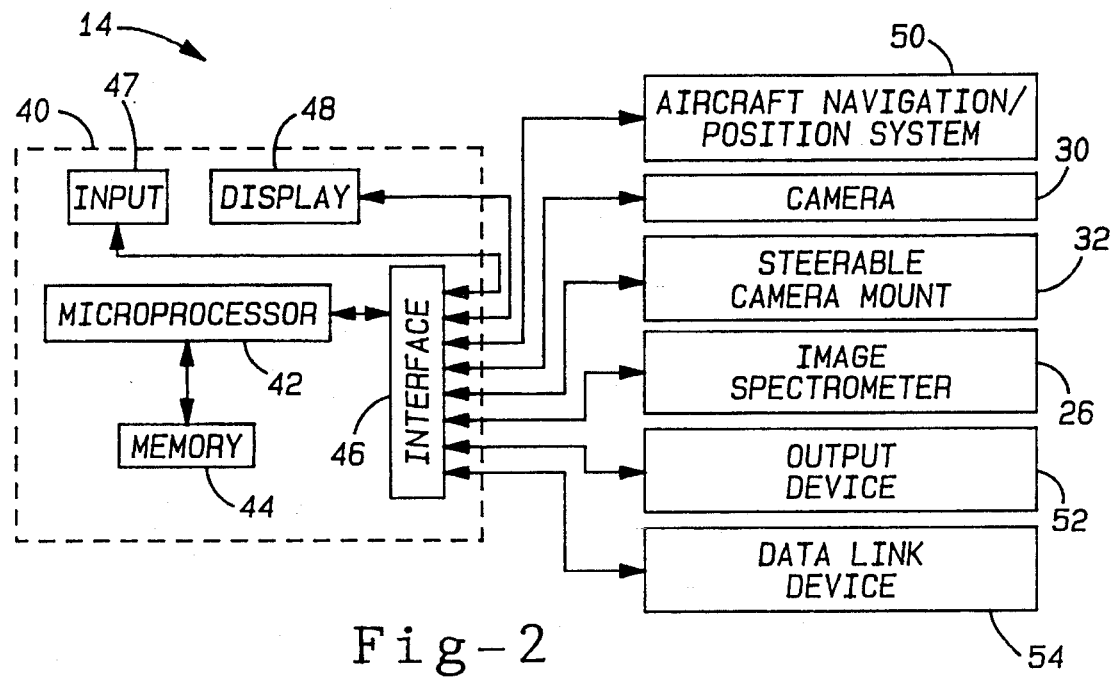
FIG. 2 is a functional block diagram of portions of said air-based station.

Referring to FIG. 2, air-based station 14 includes an airborne computer 40 with a microprocessor 42, memory 44 which can include external and internal RAM, ROM, etc., input/output (I/O) interface 46, an input device 47 and display device 48, such as a keyboard and a cathode ray tube (CRT), respectively. Air-based station 14 includes an airborne navigation/position system 50 which provides signals indicative of aircraft position (longitude, latitude, and altitude), heading, pitch, roll, and yaw in real-time to aircraft computer 40 via I/O interface 46. A datalink device 54 connected to antenna 34 receives and transmits data to ground station 18, as will be described further below. Aircraft computer 40 can include an elevation database including digital data related to the elevation of farming field 24 under study. The elevation data can be generated under control of and in synchronization with the aircraft position signals provided by airborne navigation/position system 50.

Airborne computer 40 records collected spectral and visual image data generated by image spectrometer 26 and camera 30 in memory 44. Airborne computer 40 georeferences image data generated by image spectrometer 26 and camera 30 in real time using the real-time navigation/position signals generated by aircraft navigation/position system 50, pointing signals generated by steerable mount 32, and the elevation database.

Automated control of actuation and scanning field size for image spectrometer 26 is controlled by airborne computer 40 in accordance with operator input and/or preprogrammed flight plans. Airborne computer 40 automates control of pointing, zooming (image enlargement and reduction), and actuation of camera 30 according to operator input and/or the preprogrammed flight plan.

Airborne computer 40 cues steerable camera mount 32 by analyzing spectral image data generated by image spectrometer 26 and by generating a camera pointing signal. Airborne computer 40 can automatically capture and associate image data with geographical coordinates generated by navigation/position system 50. Airborne computer 40 outputs in real-time spectral image data generated by image spectrometer 26 and camera 30 to display device 48 for review by an optional operator. Airborne computer 40 can output in real time georeferenced image data to display device 48 for data collection management by the operator. An output device 52 such as a disk drive, a printer, a video cassette recorder, digital tape, etc. may also be provided.

Airborne computer 40 provides automatic and/or operator assisted (via input device 47) mosaicking and overlapping of georeferenced images to create digital maps for large farming fields 24. The digital maps can be stored in memory 44 for later retrieval or transmitted via data link device 54 to ground station 18 for further analysis and/or output to farming machinery, etc. Airborne computer 40 can also overlay georeferenced image data onto registered vector and raster map backgrounds.

Airborne computer 40 also allows annotation of the digital maps with additional text and graphics with imagery/map products, for example "tick marking" of an exact georeferenced position of an object within georeference oblique or nadir imagery and storage of the additional text and graphics.

Figure 3:
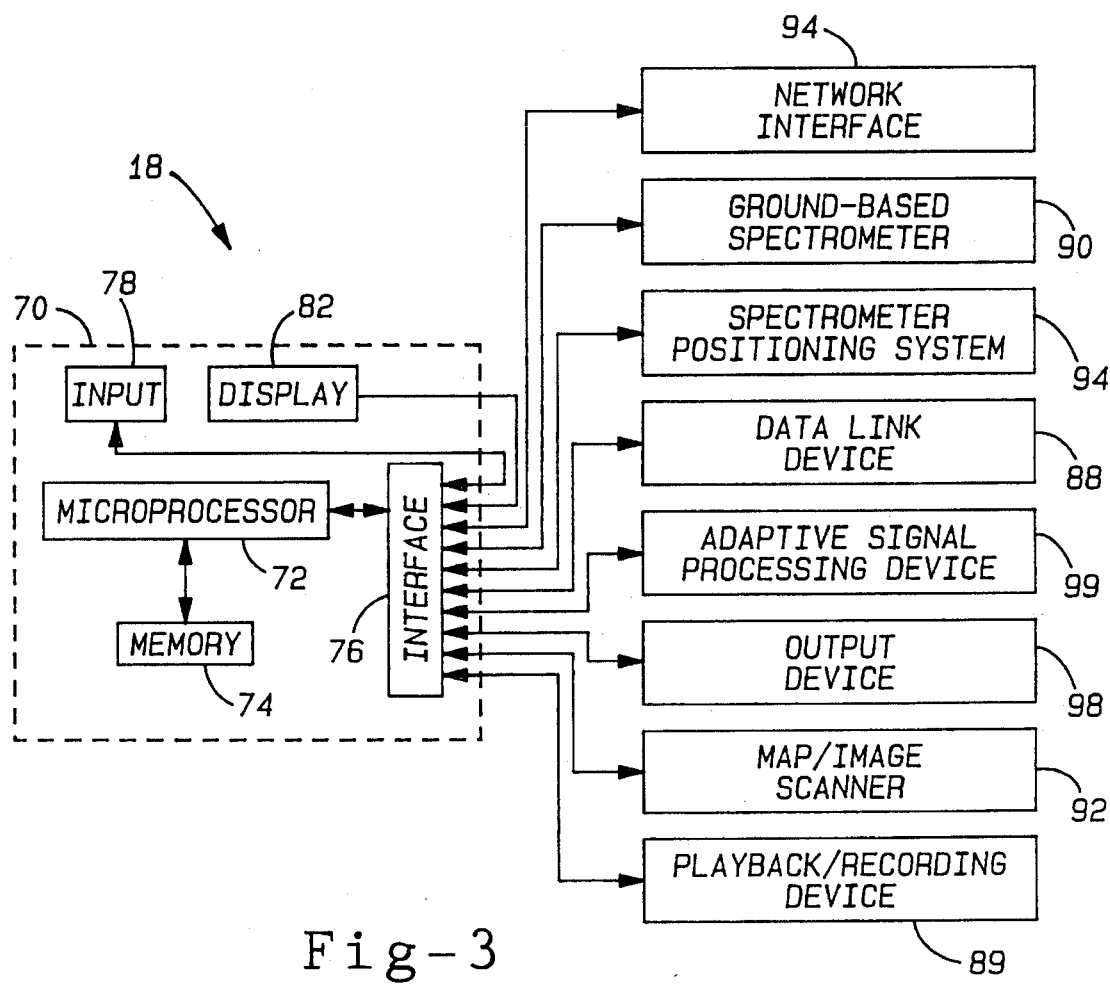
FIG. 3 is a functional block diagram of portions of said ground station.

Referring to FIG. 3, ground-based station 18 can include a ground-based computer 70 with a microprocessor 72, memory 74 which can include external and internal RAM, ROM, etc., input/output (I/O) interface 76, an input device 78 and display device 82, such as a keyboard (and/or diskdrive, etc.) and a cathode ray tube (CRT), respectively. Ground-based station 18 communicates with airborne computer 40 via datalink device 88. Ground-based computer 70 also can include an output device 98 such as a modem, digital tape, or CD-ROM drive, a map/image scanner 92, and a computer network interface 94.

A playback/recording device 89 allows video or digital input from tapes generated by air-based station 14. A ground-based spectrometer 90 collects detailed spectral image data at ground-level for vegetation and soil regions of interest. The spectral image data collected by ground-based spectrometer 90 is collected over several hundred channels over the same spectrum as the air-borne spectrometer 26. A spectrometer positioning system 94 guides and positions ground-based spectrometer 90 for recording the spectral image data for specific regions of interest.

Ground-based computer 70 and/or airborne computer 40 can perform data analysis, historical database development, and playback of airborne-collected data. Ground-based computer 70 and/or airborne computer 40 can store, retrieve, and associate airborne collected spectral image data with ground-collected spectral image data according to geographical location and date/time. Ground-based computer 70 and/or airborne computer 40 can store, retrieve, and associate ground-based soil and vegetation measurements according to geographical location and date/time.

Ground-based computer 70 and/or airborne computer 40 can correlate measurable crop characteristics, such as greenness, leaf area index and productivity with collected spectral image, nutrient, and moisture data for a growing season. Ground-based computer 70 and/or airborne computer 40 can classify collected spectral data from the camera 30 and the spectrometer 26 into crop and soil status categories using visualization (by an operator or automated), image processing, mathematical techniques, and/or an adaptive signal processing using device 99 (such as a neural network using historical spectral, vegetation and soil data). Adaptive signal processing device 99 can be executed using firmware or software and can be executed by a separate microprocessor or microprocessor 72. Ground-based computer 70 and/or airborne computer 40 can generate digital maps in hard copy and/or electronic formats for transmission via network, modem or storage on magnetic tape, disk, or CD-ROM.

Datalink devices 54 and 88 allow quick dissemination of the digital maps directly to precision farming equipment, and/or to ground station 18 which can output the digital maps or appropriate control signals to output devices 98 such as precision farming equipment, printers, and/or electronic interfaces. The digital maps can be transmitted in a variety of formats including raw images, images overlaid on raster maps, image annotation, or images with overlaid annotation. Datalink devices 54 and 88 can use image compression to achieve acceptable transfer time and digital map quality. For example, Joint Photographic Experts Group (JPEG) image compression has been found to have acceptable performance.

Figure 4:
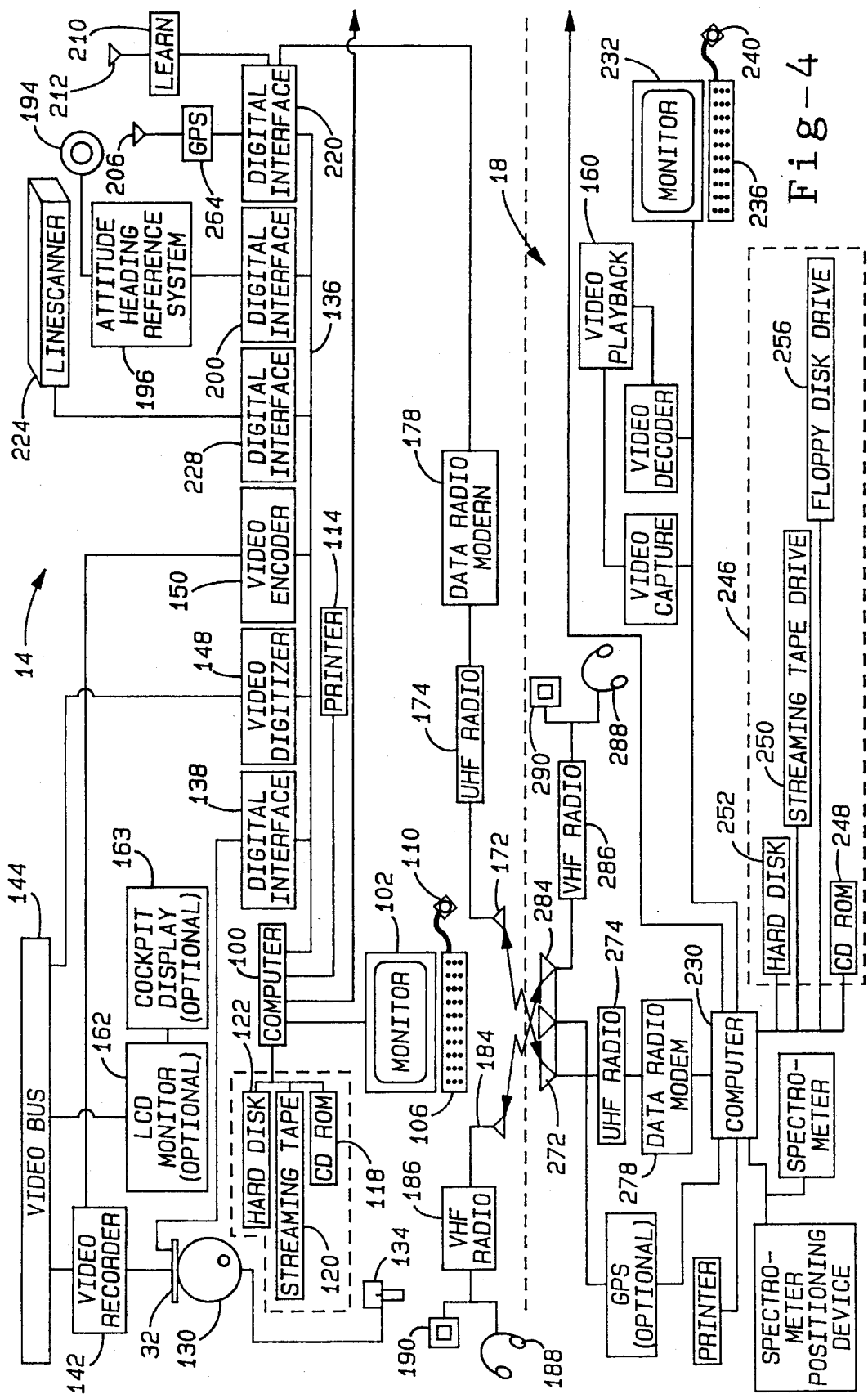
FIG. 4 is a detailed functional block diagram of both the air-based station and the ground station.

Referring to FIG. 4, aircraft computer 40 of FIG. 2 can include an airborne computer 100 connected to a monitor 102, a keyboard 106, a mouse 110, and a printer 114. Airborne computer 100 can include memory 116, for example internal RAM and ROM (not shown) and external memory such as CD ROM 118, tape 120, and/or a hard drive 122. Other types of internal and external memory are contemplated.

Camera 30 of FIG. 2 can be a high resolution color and/or thermal camera 130 connected to a steerable camera mount 32 which can be actuated using manual camera controller 134 and/or automated camera control signals can be provided by the airborne computer 100 via data bus 136 and digital interface 138. Camera 130 generates and outputs image data to a video recorder 142 which records a video signal. The video signal is transmitted by video bus 144 to a video digitizer 148 which digitizes the video signal for storage in memory 44. The camera 130 may provide direct digital output. Alternately, the camera 130 may provide analog film output that is digitized by the map/image scanner 92 at the ground station 18.

The airborne computer 100 modifies the digitized video signal by adding georeferencing, mosaicking, etc., for storage to memory, disk 122, or tape 120. The airborne computer 100 outputs position, attitude, and sensor/mount status on data bus 136 to video encoder 150 which generates an analog video signal. The analog video signal can be recorded by video recorder 142. Upon returning to the ground, the videotape can be transferred to a video playback device 160 associated with ground-based station 18, as will be described further below. Video bus 144 can also be connected to a LCD monitor 162 and a cockpit display 163 if desired.

The data link device 54 of FIG. 2 can include an antenna 172, an ultra high frequency radio (UHF) radio 174, and data radio modem 178 which are connected to data bus 136 by digital interface 180. Aircraft station 14 can also be in audio contact with ground station 18 using an antenna 184, a very high frequency (VHF) radio 186, headset 188 and speaker 190.

Airborne computer 100 can include a database in internal or external memory. The database can include elevation data, past vegetation and soil characteristics, etc. for the farming field under study. Alternatively, an on-line database accessed via a computer network can be used, for example via Ethernet®. The database can also be associated with a ground-based computer 230, described below.

The aircraft navigation/position system 50 of FIG. 2 can include a flux gate sensor 194 connected to an attitude heading reference system 196 which is connected by a digital interface 200 to data bus 136 of airborne computer 100. The aircraft navigation/positioning system 50 further includes a global positioning satellite (GPS) unit 204 and an antenna 206 for receiving a first positioning signal from a GPS. The first positioning signal provides longitude, latitude and altitude data for the aircraft 16. A long-range navigation (LORAN) interface 210 and antenna 212 generates a second positioning signal which provides longitude, latitude and altitude data. GPS unit (or position/attitude unit) 204 and LORAN interface 210 are connected by digital interface 220 to the data bus 136.

A linescanner 224 generates and collects spectral data across a wide spectrum and is connected by a digital interface 228 to the data bus 136 and computer 100. The linescanner generates and outputs spectral image data to a digital interface 228. The digital data is stored in memory 44 and/or on magnetic tape 120.

Airborne computer 100 modifies the digital data by adding georeferencing, mosaicking, etc., for storage to memory, disk 122, or tape 120. The airborne computer 100 outputs position, attitude, and sensor/mount status for storage along with the digital linescanner data to memory, disk 122, or tape 120. Upon returning to the ground, the digital tape can be transferred to playback/recording device 89 associated with ground-based station 18, as will be described further below. The digital input stream can be displayed directly on to the monitor 162 from memory. Monitor 168 can be a liquid crystal diode (LCD) monitor.

Ground-based station 18 includes a ground-based computer 230 connected to a monitor 232, a keyboard 236, a mouse 240, and a printer 244. Ground-based computer 100 can include memory 246, for example internal RAM and ROM (not shown) and external memory such as CD ROM 248, tape 250, a hard disk drive 252, and/or floppy disk drive 256. Other types of internal and external memory are contemplated.

The data link device 98 of FIG. 3 can include an antenna 272, an ultra high frequency radio (UHF) radio 274, and data radio modem 278 which can include digital interfacing for direct connection to computer 230. Ground-based station 18 can also be in audio contact with air-based station 14 using an antenna 284, a very high frequency (VHF) radio 286, a headset 288 and speaker 290.

Ground-based station 18 can include a database in internal or external memory. The database can include elevation data, past vegetation and soil characteristics, etc. for the farming field under study. Alternatively, an on-line database accessed via a computer network can be used, for example via Ethernet®. Ground-based station 18 can interface with air-based station 14 via the computer network if desired.

In use, airborne station 18 collects high resolution spectral image data over farming fields located using a preprogrammed flight plan or interactively selected by an operator. Airborne station 18 georeferences the collected spectral image data. Unusual soil surface characteristics and regions of vegetative stress are identified using vegetative stress, temperature and color indicators. Camera 30 provides zoom color image data for areas of interest by cueing based upon automated imagery analysis cues, a programmed plan, and/or operator direction.

Zoom color and/or thermal images are collected for areas of interest by cueing based on automated imagery analysis, a programmed plan, and/or operator direction. Large areas are mapped by automatic or operator-assisted mosaicking of adjacent captured images. The locations of unusual characteristics are used to direct ground-based spectral measurements and nutrition/moisture measurements. The location of the ground measurement points and other processed data can be transmitted to the ground within a few minutes of collection through datalink devices 54 and 88. Ground measurements can also be made at "normal" areas in the field.

This process is repeated on a periodic basis (daily, weekly, monthly) through the course of the growing season, with the data being stored and correlated based upon geographic location at ground-based computer 230 and/or airborne computer 100. Known conditions and/or problems are characterized and stored with the data. Crop growth trends are charted with the measured data and models are updated. Field maps showing crop and soil status are developed using manual and/or automated visualization, image processing, and mathematical techniques. The maps are output in paper or electronic form for dissemination via modem, tape, or CD-ROM.

Known conditions and nutrient/moisture status are correlated to the ground-based spectral measurements using visualization, image processing, mathematical, and/or adaptive signal processing techniques. Each ground-based spectral signature is characterized by the positions of minimum (absorption) and maximum (reflection) values (2nd derivative) and rates of change (1st derivative) between selected minima and maxima. These characteristics are generally invariant of light intensity and atmospheric factors and therefore can be correlated over time. Collected spectral image data, known conditions, and collected plant and soil data for multiple fields (and for different times) are used to build up a large sample set to develop the spectral characteristics for various stages of crop development.

Over time, and a large enough sample set, the prescription farming system 10 learns the spectral signature trends associated with normal crop growth, nutrient/moisture status, and specific crop problems on a crop-by-crop, region-by-region, and field-by-field basis.

As the ground-based spectral database is developed, algorithms for more precise detection of soil and vegetation characteristics are developed and are incorporated in airborne computer 100 along with the classification techniques for crop conditions and nutrient status. These are used to generate real-time status maps of the field directly by airborne computer 100 which can be datalinked to precision farming equipment or ground-based computers using the optional datalink. Maps can also be produced at the ground-station for hardcopy or electronic dissemination. Automated collection plans for future airborne missions are created at the ground computer and downloaded to the airborne computer system.

Figure 5:
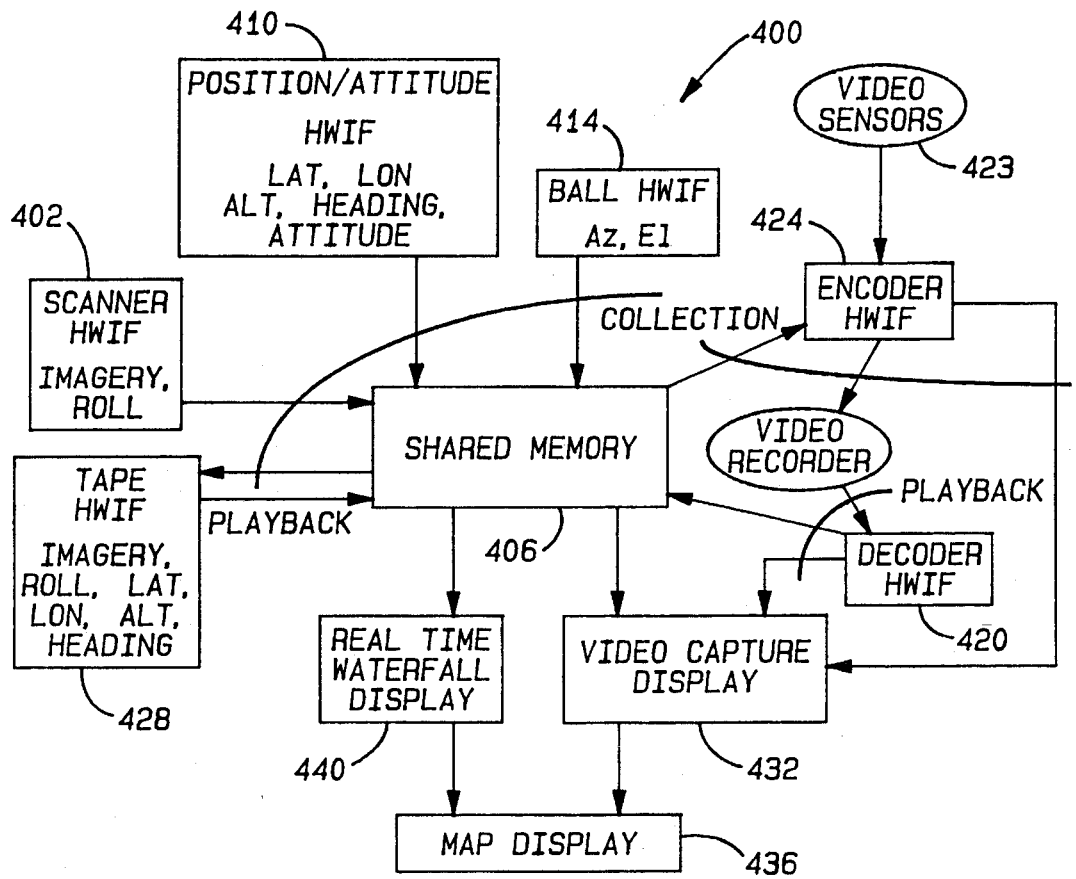
FIG. 5 illustrates data acquisition hardware interfaces which can be incorporated in the air-based station.
Figure 6:
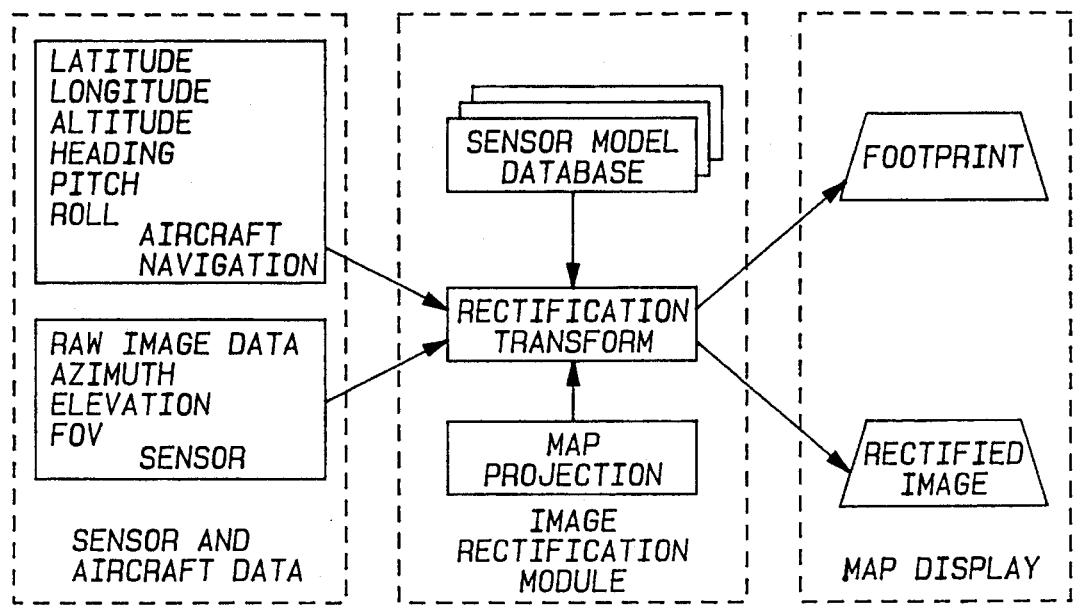
FIG. 6 is a block diagram illustrating footprint generation and image rectification.

Referring to FIGS. 5 and 6, the following sections illustrate a data acquisition interface 400 for mapping and analysis system 10 according to the inventor.

DATA ACQUISITION

1. Scanner Hardware Interface

1.1 Description

A scanner hardware interface (HWIF) 402 reads input data from image spectrometer 26 (e.g. linescanner 224) such as scan lines of imagery pixels and roll values. Scanner HWIF 402 can be a parallel interface. Input data is read in as scan line-size blocks and placed into a shared memory 406.

1.2 Pseudo-Code

```
static void scan_collect (DEVICE_CMD state)
{
while ((state 32 32 new_state) && (!quit)) {
        /* If it is the right time to sync with the
        scanner, get the status and then poll for
        a change in status*/
        if (--sync_reset21 32 O) {
            sync_to_scanner();
            sync_reset 32 READS_PER_SYNC;
        }
        /* set dst to the proper spot in shared memory to
        copy the new data to */
        dst 32 (SCAN_PIXEL *) shm_line_start (shmbuf, ShmInfo, dst_line);
        /* read data from scanner */
        b 32 read(scan_fd, (u_char *) dst, BUFSIZE);
        /* insert nav data into housekeeping channel */ insert_nav_data_in_hk_channel();
```

```
/* adjust shared memory pointers and get more
    data from scanner */
shmbuf-22 current 32 dst_line;
shmbuf-22 cycle = dst_cycle;
    }
}
```

2. Position/Attitude Hardware Interface

2.1 Description

A position/attitude HWIF 410 reads data from an input port (which can be serial) connected to position/attitude unit 204. Position/attitude unit 204 can be a Trimble Navigation GPS unit which generates data in ASCII format. A state table can be constructed and, based on the input data, a branch can be taken to read a specific token. The Latitude, Longitude, Altitude, Attitude, and Track (used for heading) are linked with appropriate scan lines in shared memory 406.

2.2 Pseudo-Code

```
/* define a large parse table which has an entry for every
ASCII value between 0 and 127. Each table entry is a
pointer to a function which parses out the specific entry. */
/* (*func)( ) */
static Boolean (*Item_Designator[128])( ) 32 {
/* 0 */
Parse_Unknown,   Parse_Unknown,   Parse_Start,      Parse_End,       Parse_Unknown,
Parse_Unknown,   Parse_Unknown,   Parse_Unknown,    Parse_Unknown,   Parse_Unknown,
Parse_Unknown,   Parse_Unknown,   Parse_Unknown,    Parse_Unknown,   Parse_Unknown,
Parse_Unknown,   Parse_Unknown,   Parse_Unknown,    Parse_Unknown,   Parse_Unknown,
/* 20 */
Parse_Unknown,   Parse_Unknown,   Parse_Unknown,    Parse_Unknown,   Parse_Unknown,
Parse_Unknown,   Parse_Unknown,   Parse_Unknown,    Parse_Unknown,   Parse_Unknown,
Parse_Unknown,   Parse_Unknown,   Parse_Unknown,    Parse_Unknown,   Parse_Unknown,
Parse_Unknown,   Parse_Unknown,   Parse_Unknown,    Parse_Unknown,   Parse_Unknown,
/* 40 */
Parse_Unknown,   Parse_Unknown,   Parse_Unknown,    Parse_Unknown,   Parse_Unknown,
Parse_Unknown,   Parse_Unknown,   Parse_Unknown,    Parse_Unknown,   Parse_Unknown,
Parse_Unknown,   Parse_Unknown,   Parse_Unknown,    Parse_Unknown,   Parse_Unknown,
Parse_Unknown,   Parse_Unknown,   Parse_Unknown,    Parse_Unknown,   Parse_Unknown,
/* 60 (A32 63) */
Parse_Unknown,   Parse_Unknown,   Parse_Unknown,    Parse_Unknown,   Parse_Unknown,
Parse_R_LAT,     Parse_R_LON,     Parse_R_TK,       Parse_R_GS,      Parse_R_DIS,
Parse_R_ETE,     Parse_R_XTK,     Parse_R_TKE,      Parse_R_DTK,     Parse_R_LEG,
Parse_R_IDENT,   Parse_R_BRG,     Parse_R_PTK,      Parse_Unknown,   Parse_Unknown,
/* 80 P */
Parse_R_EPE,     Parse_R_VAR,     Parse_Unknown,    Parse_Unknown,   Parse_R_WARN,
Parse_Unknown,   Parse_Unkwn,     Parse_Unknown,
Parse_Unknown,   Parse_Unknown,   Parse_Unknown,    Parse_Unknown,   Parse_Unknown,
Parse-Unknown,   Parse_Unknown,   Parse_Unknown,    Parse_Unknown,   Parse_R_TSLS,
/*100 d */
Parse_R_MSA,     Parse_R_MESA,    Parse_Unknown,    Parse_Unknown,   Parse_Unknown,
Parse-R_DATE,    Parse_R_TIME,    Parse_X_PS,       Parse_X-ALT,     Parse_X_TRK,
Parse_X_VERN,    Parse_X_DBTWP,   Parse_TAG,        Parse_X_POFF,    Parse_X_ETIME,
Parse_R_CODE,    Parse_K_WPTYP,   Parse_X_ETSOL,    Parse_Unknown,   Parse_K_WP,
/*120 x */
Parse_Unknown,   Parse_Unknown,   Parse_X_MODE,     Parse_Unknown,   Parse_Unknown,
Parse_Unknown,   Parse_Unknown,   Parse_Unknown };
/*****/
void trimble_main (char *prog, char *file, int delay)
{
 /* initialize serial port connection with GPS */
GPS_init( );
/* loop thru endlessly reading data from GPS */
for (;;) {
        Read_Trimble ( );
        passes 32 0;
        while (End22 Current) {
           ID 32 *Current30 30 ;
           Item_Designator[(int) ID]( );
           Skip_Line();
           passes30 30 ;
        }
        /* format everything to send it out */
        utl_cvt_deg_to_dms (&msg.lat.decgree,
                  &msg.lat.minute,
                  &msg.lat.hundred,
                  msg.lon.raw);
```

-continued

```
utl_cvt_deg_to_dms (&msg.lon.degree,
                    &msg.lon.minute,
                    &msg.lon.hundred,
                    msg.lon.raw);
/* put nav info into shared memory */
shmbuf–22 current_nav.lat = Nav.lat;
shmbuf–22 current_nav.lon = Nav.lon;
shmbuf–22 current_nav.hed 32 Nav.hed;
if (Nav.alt!=O) shmbuf–22 current_nav.alt = Nav.alt;
rap_send (&msg);
```

3. Ball Hardware Interface

3.1 Description

A ball HWIF 414 (for example associated with steerable sensor mount 32) points a ball with a sensor mounted inside to a target specified either by the user or automatically computed by the system. The ball can be used with the camera or the image spectrometer. Directional parameters (e.g. azimuth and elevation) of the ball (and consequently the sensor mounted therein) are output to shared memory 406. The ball HWIF 414 must continuously send commands to the hardware to keep the ball pointed in the proper location.

3.2 Pseudo-Code

4. Encoder Hardware Interface

4.1 Description

All the navigation, attitude, and camera angle measurements from video sensor 423 are input to an encoder HWIF 424 which encodes the data on an input video signal. Decoder HWIF 420 decodes the navigation, attitude and camera angle measurements as previously described.

4.2 Pseudo-Code

```
void Skyball::Point(void)
{
        float az, el;
        float mode 32 shmbuf–22 skyball.mode;
        if ((mode 32 32 STOWMODE) || (mode == NADIRMODE) || (mode FORWARDMODE))
                az 32 shmbuf–22 sensors.units[SENSOR FLIR].azm;
                el 32 shmbuf–22 sensors.units(SENSOR-FLIR].ele;
        }
        else //search mode
        {
                searchazel(az, el);
                shmbuf–22 sensors.units[SENSOR_FLIR].azm 32 az;
                shmbuf–22 sensors.units[SENSOR_FLIR].ele 32 el;
                shmbuf–22 sensors.units(SENSOR_COLOR].azm 32 az;
                shmbuf–22 sensors.units(SENSOR_COLOR].ele 32 el;
        }
        // process command
        int sum 32 167;                          // 167 is ascii sum for 'GOO'
        // convert float to hex3
        char azbuf[3];
        sum 32 convert2hex(azbuf, az, POSSCALE);
        char elbuf[3];
        stun 30 32 convert2hex(elbuf, el, POSSCALE);
        // calculate checksum
        sum 32 ((( sum & OxfO ) 22 22 4 ) 30 ( sum & OxOf )) & OxOf;
        char chksum 32 itoh(sum);
        // send instruction to gimbal
        (void)sprintf(outputbuf, "GOO%.3s%.3s%c\r", azbuf, elbuf, chksum);
        int nwrite 32 port.Write(outputbuf, GOBUFSIZE);
        // Read response from gimbal
        int nread 32 port.Read(inputbuf, GIBUFSIZE);
        if (nread 22 0)
        {
                shmbuf–22 sensors.units[SENSOR_FLIR].alive 32 1;
                shmbuf–22 sensors.units[SENSOR_COLOR).alive 32 1;
        }
};
```

```
void
Encoder::MainLoop ( )
{
        char junk[JUNK_LEN];
        NAV_DATA nav;
        NAV_DATA jimnav;
        ENCODED_DATA codedata;
        // hand-shaking
        buffer[O] 32 'S';
        buffer[1] 32 BUFFER_LEN – 2;        // data length
for (;;)
{
                        int count 32 port–22 Read(junk, JUNK_LEN);
                        // get system nav data
                nav 32 shmbuf–22 current_nav;
                        // get sensor-dependent data
                        nav.azm 32 shmbuf–22 sensors.units[_unit].azm;
                        nav.ele 32 shmbuf–22 sensors.units[_unit].ele;
        // optimize here, we only need hfov to encode
        nav.hfov 32 shmbuf–22 sensors.units[_unit].hfov;
        nav.vfov 32 shmbuf–22 sensors.units[_unit].vfov;
                        encode(&codedata, &nav, _hfov_avg, _wideflag, _narrowflag);
                        memcpy(&buffer[2], &codedata, BUFFER_LEN – 2);
                        port–22 Write(buffer, BUFFER_LEN);
        sleep(l);
   }
}
```

5. Decoder Hardware Interface

5.1 Description

A decoder HWIF 420 decodes all navigation, attitude, and camera angle measurements from the video signal and stores the data in shared memory 406.

5.2 Pseudo-Code

6. Tape Hardware Interface

6.1 Description

A tape HWIF 428 is used during collection and playback modes. When collecting, the tape 124 stores all data written to shared memory 406 by GPS HWIF 410 and scanner HWIF 402. During playback, tape HWIF 428 restores the contents of shared memory 406 to the same state as during collection. The GPS and scanner HWIF 410 and 402 are not running during playback.

```
void
Decoder::MainLoop()
{
        for (;;)
        {
                port–22 Write(outbuf, 3);
                usleep(500000);
                        count 32 port–22 Read(inbuf, TMPLEN);
                for (n 32 0 n 21 BUFFER_LEN; n30 30 )
{
                        buffer[n] 32 tmpnum[n];
}
decode((ENCODED_DATA*)buffer, &nav);
// set system nav data nav.yaw 32 0.0; shmbuf–22 current nav = nav;
nav.yaw 32 0.0;
shmbuf–22 current_nav 32 nav;
// get sensor-dependent data
kludge, fill in data for all sensors, change if we have more than 1 decoder
// more than 1 decoder
 for (_unit 32 0 ; _unit 21 ACTIVE_SENSORS; _unit30 30 )
{
        shmbuf->sensors.units[_unit].azm 32 nav.azm;
        shmbuf->sensors.units[_unit].ele 32 nav.ele;
        shmbuf->sensors.units[_unit].hfov 32 nav.hfov;
        shmbuf->sensors.units[_unit].vfov 32 nav.vfov;
   }
  }
}
```

```
static void tape_record (DEVICE_CMD prev_cmd)
{
        set_tape_state (TAPE_STATE_RECORDING,NO_MSG,"");
        new_cmd 32 prev_cmd;
        while ((new_cmd 32 32 prev_cmd) && (!quit)) {
        /* set pointers to the current shared memory data */
        shm_cycle 32 shmbuf->cycle;
        shm_line 32 shmbuf->current;
        /* Copy from shared memory to the tape,
        wrap around the buffer as necessary.
        */
        for (i32 new_full_lines; i22 O ; i--)
                memcpy (blk 30 (ShmInfo->bpl*blk_In),
                        shm line start (shmbuf, ShmInfo, local_line),
                        ShmInfo->bpl);
        usleep(RECORD_DELAY);
}
/*****/
static void tape_play (DEVICE_CMD prev_cmd, int delay)
{
        set_tape_state (TAPE_STATE_PLAYING_FAST,NO_MSG,"");
        while ((new_cmd 32 = prev_cmd) && (!quit)) {
                /* get buffer from tape */
                tape_dev_read (tape_fd,
                                        blk,
                                        (LINES_PER_BLK*ShmInfo->bpl),
                                        errbuf);-
        /* write buffer to shared memory */
        if (!quit) {
                memcpy (shm_line_start (shmbuf, ShmInfo, dst_line),
                blk 30 (blk_In*ShmInfo->bpl),
                ShmInfo->bpl);
        /* update shared memory pointers */
        shmbuf->current = dst_line;
        shmbuf->cycle = dst_cycle;
        }
        /* delay for the specified time */
        usleep (delay);
        }
    }
}
```

7. Video Capture Display

7.1 Description

A video capture display 432 captures a video signal from the real-time video display and saves the frame (or multi-frame) along with navigation, attitude, and camera angle parameters to a snap shot. This data is output to a map display 436 for image rectification.

7.2 Pseudo-Code

```
static void
colorsaveit(...)
{
        XtVaSetValues(...);
        image = XGetImage(...);
        XtVaSetValues(...);
        */ strip the top and bottom of the picture */
                stripdata = beautify(...);
                newimage = XCreateImage(...);
        sprintf(name, "%s/%s.xwd", utl_env_value("ACCSNAP","."), fname) ;
        if (! (file = fopen (name, "w"))) {
        fprintf (stderr, "videosave : error in fopen : %s\n", name);
        return;
        }
        Window_Dump(..);
        fclose(file);
        XDestroyImage(newimage);
         XDestroyImage(image);
        postprocess(fname);
        savenavfile(fname, SENSOR_COLOR);
}
```

8. Real-Time Waterfall Display

8.1 Description

A real-time waterfall display 440 reads imagery data from shared memory 406 and displays the imagery data to the user in a window where the scan lines are scrolled from the top of the display to the bottom. When the user saves a snapshot, the snapshot data is sent to the map display 436 along with its navigation data used for image rectification.

8.2 Pseudo-Code

```
static void wf_data_cb()
}
                /* check to see how much data should be copied from
                the shared memory buffer */
                shm_cycle = shmbuf->cycle;
                shm_line = shmbuf->current;
                /* extract the channels which are used in the waterfall
                from the shared memory and put them in the
                raw_buffer
*/
                for (i32 new_raw_lines ; i22 O ; i--) {
                        for (ch32 0; ch21 RAW_CHANNELS; ch30 30 ) {
                                copy_channel();
                        }
                }
                /* Check if there are more lines than what will
                fit in the Ximage update buffer. If there are,
                skip the ones which don't fit. */
                if (new_raw_lines 22 WF_UPDATE_LINES*WF_REDUCTION) {
                skip_lines ( );
                }
                fill_ximage_buffer( );
                if (upd_lines 22 0) {
                /* There are new lines in the Ximage which need to be
                added to the Pixmap and screen. Be sure to wrap if necessary. */
                        XPutImage(XtDisplay(wf_draw_w), wf_frame->pixmap,
                                cgc, upd_buf->Ximage,
                                0, 0, 0, scan_line,
                                WF_PIXELS,lines_to_copy);
                /* copy data in 2nd frame to 1st frame of pixmap */
                XCopyArea(XtDisplay(wf_draw_w),
                        wf_frame->pixmap,
                        wf-frame->pixmap,
                        cgc,
                        0, scan_line,
                        WF_PIXELS, line_to_copy,
                        0, copy_line);
                /* update screen (window) */
                XCopyArea(XtDisplay(wf_draw_w),
                        wf_frame->pixmap,
                        XtWindow(wf_draw_w),
                        wgc,
                        0, copy_line,
                        WF_PIXELS, WF_FRAME_LINES,
                        0, 0);
```

-continued

```
        draw-snap_foot( );
        /* if at the start of frame 2, go back to bottom of frame 2 */
        if (lines_to_copy != upd_lines)
                lines_to_copy = upd_lines - lines_to_copy;
        }
    }
        data_timer = Add_Timeout (DATA_INTERVAL,wf_data_cb,NULL);
}
```

SENSOR FOOTPRINT CALCULATION AND IMAGE RECTIFICATION

1. Mapping and Analysis System Capabilities

The mapping and analysis system 10 has the ability to display, in real-time, a footprint (FIGS. 6 and 7) that is an indication of a sensor's field of view on the ground. The real-time nature of the sensor footprint is extremely useful when producing a mosaic of imagery by providing the operator with the ability to optimize ground coverage.

Furthermore, the sensor image data may be projected within the footprint onto a map to provide image geo-referencing. Two suitable map projections are Mercator and Universal Transverse Mercator (UTM), representing planar or elevation mapping.

Additionally, the mapping and analysis system 10 operates with three different sensor types: framing camera, scanning camera and single line scanner. Each of these sensors is parameterized so that a database may be created to support sensors of varying specifications.

2. Sensor Footprint and Image Rectification Overview

In the mapping and analysis system 10, the sensor footprint is calculated using the sensor type, the sensor's orientation relative to the aircraft, and the aircraft's orientation relative to the ground. The sensor footprint is initially calculated relative to a point directly below the aircraft. The aircraft's position along with the map projection determines where the footprint points are rendered on the map display. Image rectification parameters are determined from the sensor footprint calculation and are then used to project the image onto the map.

A. Footprint And Rectification Transformations

A transformation that describes the relationship between points in the image and points on the ground must be defined to calculate the sensor footprint and perform image rectification. Sensor footprint calculation and image rectification are inverse functions. For the sensor footprint calculation, the location of the boundary points (four corners) of the image on the ground are located. Conversely, the projection of the sensor image onto the ground requires the transformation of each point within the footprint to the image point (or pixel) that projects to that point.

B. Reference Coordinate Systems

Figure 7:
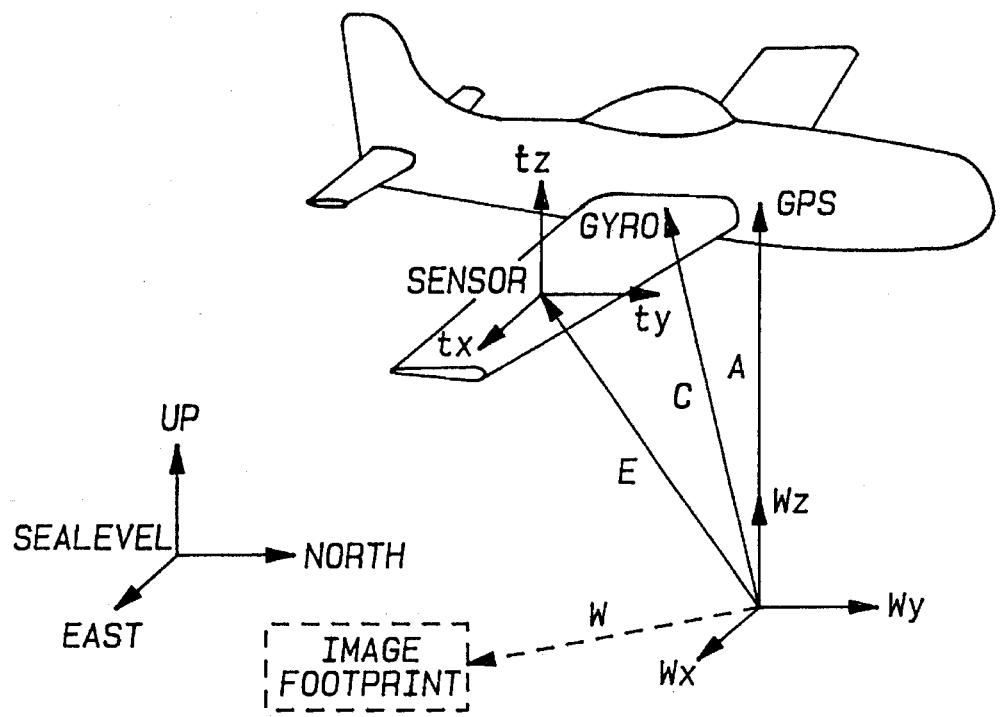
FIG. 7 illustrates world and image coordinate systems.

To define the transformation, a world coordinate system is chosen with the origin at sea level directly below the aircraft navigation/position system 50 (or GPS unit 204) of the aircraft. Referring to FIG. 7, the axes of the world coordinate system are defined as follows:

| | |
|---|---|
| $W_x$ | distance in meters East; |
| $W_y$ | distance in meters North; and |
| $W_z$ | altitude in meters. |

Assuming the image coordinate system is aligned with GPS unit 204, the axes of the image coordinate system are defined as follows:

| | |
|---|---|
| $I_x$ | distance in meters horizontal from optical center; |
| $I_y$ | distance in meters along the optical axis; and |
| $I_z$ | distance in meters vertical from optical center. |

The reference position of the aircraft, (i.e. roll=pitch=heading=0), is defined as the nose pointing along the positive Y axis with the wings in the X-Y plane.

C. Transform Calculation

The following data is provided dynamically from the aircraft navigation/position system 50 and the sensor (or sensor mounting system, e.g., steerable camera mount 32):

| | |
|---|---|
| $\beta$ | Aircraft Heading (30 is CW from North); |
| $\phi$ | Aircraft Pitch (30 is Nose Up); |
| $\omega$ | Aircraft Roll (30 is CW rotation); |
| $A_z$ | Aircraft Altitude in meters; |
| $\alpha$ | Sensor Azimuth (30 is CW rotation); |
| $\epsilon$ | Sensor Elevation (− is Sensor Down); |
| $\pi$ | Sensor Mount Pitch (30 is Sensor Up); |
| $\rho$ | Sensor Mount Roll (30 is CW rotation); |
| $\delta$ | Magnetic Declination; and |
| $\vec{V}$ | offset of the Sensor from the GPS as measured with respect to the aircraft coordinate system (static). |

The following are defined:

| | |
|---|---|
| $\vec{A}$ | Aircraft Position in World Coordinates; |
| $\vec{C}$ | Aircraft Rotation Center in World Coordinates; |
| $\vec{E}$ | Sensor Position in World Coordinates; |
| $\vec{W}$ | Arbitrary Point in World Coordinates; |
| $\vec{I}$ | Arbitrary Point in Image Coordinates; |
| $\vec{P}$ | Arbitrary Point in Pixel Coordinates; |
| $R_a$ | Rotation matrix due to aircraft orientation; |
| $R_s$ | Rotation Matrix due to sensor orientation; |
| $R_{(x,y,z)}$ | Rotation Transformation about the (x,y,z) axes; |
| $R$ | Composite Rotation Matrix; |
| $M$ | $R^T$; |
| $\lambda$ | Constant (distance along the optical axis); and |
| $\kappa$ | $\frac{1}{\lambda}$. |

Equations defining the transformation between world and image coordinates are given by the following:

$$\vec{I} = \kappa R (\vec{W} - \vec{E}), \text{ and} \qquad (1)$$

$$\vec{W} = \vec{E} + \lambda M \vec{I}. \quad (2)$$

Note that equations (1) and (2) are parametric equations of a line in world coordinates originating at the sensor location.

The rotation matrix R is a composite of the aircraft and sensor rotations defined as follows:

$$R_a = R_y(-\omega)R_x(-\phi)R_z(\beta+\delta) \quad (3)$$

$$R_s = R_x(-\epsilon)R_z(\alpha)R_y(-\rho)R_x(-\pi) \quad (4)$$

$$R = R_s R_a \quad (5)$$

To express the transform in terms of available measurements, part of equation (1) can be expanded as follows:

$$(\vec{W} - \vec{E}) = \underbrace{(\vec{W} - \vec{C})}_{\text{point to rot center}} - \underbrace{(\vec{E} - \vec{C})}_{\text{sensor to rot center}} \quad (6)$$

$$= \underbrace{(\vec{W} - \vec{C})}_{\text{point to rot center}} - \underbrace{(\vec{E} - \vec{A})}_{\text{sensor to GPS}} - \underbrace{(\vec{A} - \vec{C})}_{\text{GPS to rot center}} \quad (7)$$

$$= \underbrace{(\vec{W} - \vec{A})}_{\text{point to GPS}} - \underbrace{(\vec{E} - \vec{A})}_{\text{sensor to GPS}} \quad (8)$$

Note that the measurement $\vec{V}$ is defined as the offset of the sensor from the GPS unit 204 with respect to the aircraft coordinate system. This may be expressed as:

$$\vec{V} = R_a(\vec{E} - \vec{A}) \quad (9)$$

We can now solve for $\vec{E}$ as:

$$\vec{E} = \vec{A} + MR_s \vec{V} \quad (10)$$

Equations (1) and (2) form the basis for the rectification and footprint algorithms respectively.

To complete the transformation algorithms we need a relationship between image coordinates, $\vec{I}$, and pixel coordinates $\vec{P}$. This portion of the transformation is dependent on the type of sensor used and is described more fully below.

Note that for each sensor pixel coordinate system we consider the pixels to be indexed by sample and line with indices increasing from upper left to bottom right.

D. Frame Camera Model

For the frame camera model, the following parameters are

| f | Sensor Focal Length in meters; |
|---|---|
| $S_s$ | Sensor Pixel Spacing in meters; and |
| $N_S, N_L$ | Sensor Image Size in pixels (samples, lines). |

The following parameters are defined:

| (S,L) | Arbitrary Pixel (sample, line); |
|---|---|
| $\vec{I}$ | Arbitrary Point in image coordinates; and |
| $(S_o, L_o)$ | Optical Center in pixel coordinates (sample, line). |

The relationship between image coordinates and pixel coordinates is then given by:

$$\vec{I} = \begin{pmatrix} (S - S_o)S_s \\ f \\ -(L - L_o)S_s \end{pmatrix} \quad (11)$$

and $$\vec{P} = \begin{pmatrix} S \\ 1 \\ L \end{pmatrix} = \begin{pmatrix} \dfrac{I_x}{S_s} + S_o \\ 1 \\ -\dfrac{I_z}{S_s} + L_o \end{pmatrix}. \quad (12)$$

To incorporate this relationship into equations (1) and (2) we can further define the matrices J and K as:

$$J = \begin{pmatrix} S_s & -S_o S_s & 0 \\ 0 & f & 0 \\ 0 & L_o S_s & -S_s \end{pmatrix} \quad K = \begin{pmatrix} \dfrac{1}{S_s} & \dfrac{S_o}{f} & 0 \\ 0 & \dfrac{1}{f} & 0 \\ 0 & \dfrac{L_o}{f} & -\dfrac{1}{S_s} \end{pmatrix}$$

such that $$\vec{I} = J\vec{P} \text{ and } \vec{P} = K\vec{I} \quad (13)$$

to incorporate J and K into M and R, let $$\dot{M} = MJ \text{ and } \dot{R} = KR \quad (14)$$

now, substituting (13) and (14) into equations (1) and (2) gives $$\vec{P} = \kappa \dot{R}(\vec{W} - \vec{E}) \quad (15)$$

$$\vec{W} = \vec{E} + \lambda \dot{M} \vec{P} \quad (16)$$

E. Scanning Camera Model

For the scanning camera model, the following parameters are given:

| C | Radius of Imaging Surface; |
|---|---|
| $N_S, N_L$ | Sensor Image Size in pixels (samples, lines); and |
| $FOV_H, FOV_V$ | Horizontal and Vertical Field of View. |

The following parameters are defined:

| $\theta, \phi$ | Angular Displacement from optical center (horizontal, vertical); |
|---|---|
| $\vec{I}$ | Arbitrary Point in image coordinates; |
| $IFOV_H$ | Horizontal Instantaneous fov(= $FOV_H/N_S$); |
| $IFOV_V$ | Vertical Instantaneous fov(= $FOV_V/N_L$); |
| $(S\rho, L_o)$ | Optical Center in pixel coordinates; and |
| $R_n$ | Row n of the R Matrix. |

The relationship between image coordinates and pixel coordinates is given by:

$$\vec{I} = \begin{pmatrix} C\tan\theta \\ C \\ C\tan\phi \end{pmatrix} \tag{17}$$

with $$\theta = (S-S_o)IFOV_H, \text{ and} \tag{18}$$

$$\phi = -(L-L_o)IFOV_H \tag{19}$$

such that $$\vec{I} = \begin{pmatrix} C\tan([S-S_o]IFOV_H) \\ C \\ -C\tan([L-L_o]IFOV_V) \end{pmatrix}. \tag{20}$$

Substituting (20) into equation (1) and solving for S and L gives:

$$\vec{P} = \begin{pmatrix} S \\ 1 \\ L \end{pmatrix} = \begin{pmatrix} S_o + \frac{1}{IFOV_H}\tan^{-1}\left[\frac{\vec{R}_0(\vec{W}-\vec{E})}{\vec{R}_1(\vec{W}-\vec{E})}\right] \\ 1 \\ L_o + \frac{1}{IFOV_V}\tan^{-1}\left[\frac{\vec{R}_2(\vec{W}-\vec{E})}{\vec{R}_1(\vec{W}-\vec{E})}\right] \end{pmatrix} \tag{21}$$

Substituting (20) into equation (2) gives:

$$\vec{W} = \vec{E} + C\lambda M \begin{pmatrix} \tan([S-S_o]IFOV_H) \\ 1 \\ -\tan([L-L_o]IFOV_V) \end{pmatrix}. \tag{22}$$

F. Single Line Scanner Model

The line scanner 224 model is essentially a one dimensional version of the scanning camera ($N_L=1$). For the line scanner model, the following parameters are given:

| | |
|---|---|
| C | Radius of Imaging Surface; |
| $N_S$ | Sensor Image Size in pixels (samples, lines); and |
| $FOV_H$ | Horizontal and Vertical Field of View. |

The following are defined:

| | |
|---|---|
| $\theta$ | Angular Displacement from optical center (horizontal); |
| $\vec{I}$ | Arbitrary Point in image coordinates; |
| $IFOV_H$ | Horizontal Instantaneous fov(= $HFOV_H/N_S$); |
| $S_o$ | Optical Center Sample in pixel coordinates; and |
| $R_n$ | Row n of the R Matrix. |

The relationship between image coordinates and pixel coordinates is given by:

$$\vec{I} = \begin{pmatrix} C\tan\theta \\ C \\ 0 \end{pmatrix} \tag{23}$$

with $$\theta = (S-S_o)IFOV_H \tag{24}$$

so that $$\vec{I} = \begin{pmatrix} C\tan([S-S_o]IFOV_H) \\ C \\ 0 \end{pmatrix}. \tag{25}$$

Substituting (25) into equation (1) and solving for S gives:

$$\vec{P} = \begin{pmatrix} S \\ 1 \\ 0 \end{pmatrix} = \begin{pmatrix} S_o + \frac{1}{IFOV_H}\tan^{-1}\left[\frac{\vec{R}_0(\vec{W}-\vec{E})}{\vec{R}_1(\vec{W}-\vec{E})}\right] \\ 1 \\ 0 \end{pmatrix}. \tag{26}$$

Substituting (25) into equation (2) gives:

$$\vec{W} = \vec{E} + C\lambda M \begin{pmatrix} \tan([S-S_o]IFOV_H) \\ 1 \\ 0 \end{pmatrix}. \tag{27}$$

3. Footprint Calculation

In general, footprint calculation consists of projecting the four corner points of the image onto the ground. These calculations are based on equation (2) and are recomputed for each navigational update, sensor movement, or image snapshot. To illustrate the footprint calculation process we will consider the frame camera model. The equations for the remaining sensor types are analogous to those of the frame camera.

In all cases, we initially compute R and $\vec{E}$ from the sensor and navigation data. When an image snapshot is taken (i.e. current sensor image is geo-referenced), the matrix M is additionally computed and saved along with $\vec{E}$ for this image.

A. Planar Terrain

For planar terrain, we make the assumption that a ray from the sensor intersects the ground at a point where $\vec{W}_z = Z_T$, where $Z_T$ is a known constant.

For the frame camera, equation (2) may be rewritten as:

$$W_x = E_x + \lambda(M_{00}S + M_{01} + M_{02}L); \tag{28}$$

$$W_y = E_y + \lambda(M_{10}S + M_{11} + M_{12}L); \tag{29}$$

$$Z_T = E_z + \lambda(M_{20}S + M_{21} + M_{22}L). \tag{30}$$

We can solve for $\lambda$ in equation (31) as $$\lambda = \frac{(Z_T - E_z)}{(M_{20}S + M_{21} + M_{22}L)}. \tag{31}$$

Solving for $W_x$ and $W_y$ gives:

$$W_x = E_x + (Z_T - E_z)\frac{(M_{00}S + M_{01} + M_{02}L)}{(M_{20}S + M_{21} + M_{22}L)}; \tag{32}$$

and $$W_y = E_y + (Z_T - E_z)\frac{(M_{10}S + M_{11} + M_{12}L)}{(M_{20}S + M_{21} + M_{22}L)}. \tag{33}$$

Equations (32) and (33) may now be evaluated at each of the four corner points of the image as follows:

$$(S_c, L_c) = \left\{ \begin{array}{cc} (0, & 0) \\ (0, & N_S-1) \\ (N_L-1, & N_S-1) \\ (N_L-1, & 0) \end{array} \right\}$$

to determine the world coordinates of the footprint. These coordinates are the offsets in the meters of the corners of the footprint from the point on the ground directly below the aircraft position sensor (GPS). Now, based on the aircraft position, (in latitude and longitude), and the map projection, the footprint is plotted in the map coordinate system.

B. Non-Planar Terrain

Figure 8:
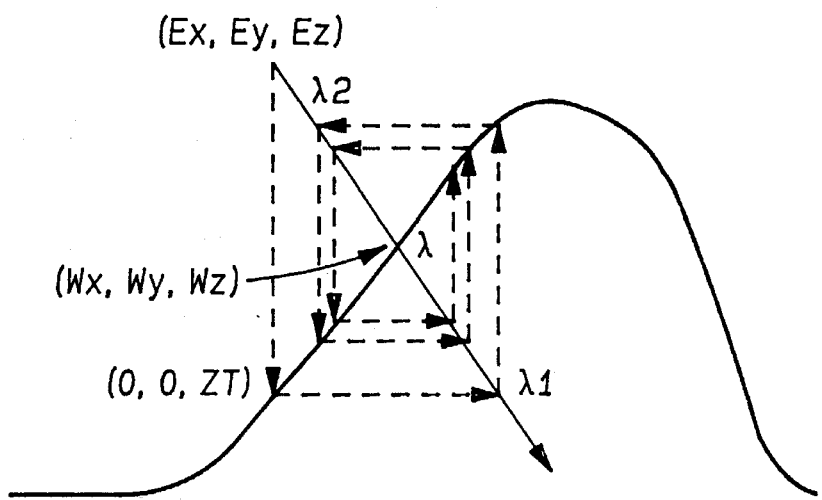
FIG. 8 illustrates non-planar terrain calculations.

In the planar case, we made the assumption that ray from the sensor intersects the ground at $Z_T$ which allowed easy computation of $\lambda$. However, for non-planar terrain, we can not make this assumption as the point of intersection is dependent of the terrain elevation. Additionally, $\lambda$ must be determined for each corner of the footprint. The value of $\lambda$, (and subsequently $\vec{W}$), may be calculated iteratively. FIG. 8 is a graphical illustration of the iteration scheme. Once the world coordinates of the footprint have been determined, the footprint may be projected onto the map as in the planar case. Note that this is only an approximation of the footprint since we have only considered the corner points of the image. To be more precise, each point along the footprint boundary must be calculated in a manner similar to the corner calculations.

4. Image Rectification

In general, image rectification involves selecting an area on the ground, and then determining which image pixels (if any) project to the points in that area. The image rectification calculations are based on equation (1) and are computed for each image snapshot. At the point the image rectification is performed, the values of M and $\vec{E}$ are known from the footprint calculation. Additionally, the bounding rectangle of the footprint is used to limit the ground area of the image projection.

A. Planar Terrain

For the planar terrain case we make the same assumptions as for the footprint calculation ($W_z = Z_T$). Equation (1) may be rewritten as:

$$\vec{P} = \begin{pmatrix} S \\ 1 \\ L \end{pmatrix} = \begin{pmatrix} \kappa[R_{00}(W_x - E_x) + R_{01}(W_y - E_y) + R_{02}(Z_T - E_z)] \\ \kappa[R_{10}(W_x - E_x) + R_{11}(W_y - E_y) + R_{12}(Z_T - E_z)] \\ \kappa[R_{20}(W_x - E_x) + R_{21}(W_y - E_y) + R_{22}(Z_T - E_z)] \end{pmatrix} \quad (34)$$

Solving for S and L gives:

$$S = \frac{R_{00}(W_x - E_x) + R_{01}(W_y - E_y) + R_{02}(Z_T - E_z)}{R_{10}(W_x - E_x) + R_{11}(W_y - E_y) + R_{12}(Z_T - E_z)}; \quad (35)$$

and $$L = \frac{R_{20}(W_x - E_x) + R_{21}(W_y - E_y) + R_{22}(Z_T - E_z)}{R_{10}(W_x - E_x) + R_{11}(W_y - E_y) + R_{12}(Z_T - E_z)}. \quad (36)$$

To perform the rectification, $(S_i, L_i)$ are calculated for each point $(W_x, W_y)$ in the bounding rectangle. The choice of sampling of the bounding rectangle is based on the sampling in the map display. If a given $(S_i, L_i)$ is within the image area, [O, NS] and [O, $N_L$], then $(W_x, W_y)$ is set to a value proportional to the image pixel value at $(S_i, L_i)$. Note that the above calculation does not result in discrete values for $S_i$ and $L_i$ therefore bi-cubic interpolation of the pixel values is performed in the neighborhood of $(S_i, L_i)$ to determine the value.

B. Non-Planar Terrain

In the non-planar case, the terrain elevation is given for each point within the bounding area. This may be expressed as:

$$W_z = Z(W_x, W_y). \quad (37)$$

Equations (35) and (36) now become:

$$S = \frac{R_{00}(W_x - E_x) + R_{01}(W_y - E_y) + R_{02}(Z(W_x, W_y) - E_z)}{R_{10}(W_x - E_x) + R_{11}(W_y - E_y) + R_{12}(Z(W_x, W_y) - E_z)}; \quad (38)$$

and $$L = \frac{R_{20}(W_x - E_x) + R_{21}(W_y - E_y) + R_{22}(Z(W_x, W_y) - E_z)}{R_{10}(W_x - E_x) + R_{11}(W_y - E_y) + R_{12}(Z(W_x, W_y) - E_z)}. \quad (39)$$

At this point, the rectification procedure is the same as the planar case.

5. Implementation (Pseudo-Code)

The following pseudo-code illustrates the implementation of the footprint calculation and image rectification algorithms for the frame camera model on planar terrain.

The following values are common to all functions.

```
MATRIX R, Ra, Rs, M, J, K;
VECTOR V, E, A;
CONSTANT MATRIX Identity;      --Identity Matrix
CONSTANT MATRIX Zero;          --Zero Matrix
```

Image_Footprint () calculates the four corner ground points of the image footprint based on the aircraft and sensor position and orientation.

```
function Image_Footprint(FP, So, Lo, Ss, Ls, Ns, Nl,
                spx, spy, spz,
                alt, hed, pit, rol, spt, srl, azm, ele)
    -- FP         : sensor focal point
    -- So Lo      : optical center
    -- Ss Ls      : sensor pixel spacing
```

```
-- Ns Nl          : sensor number of samples lines
-- spx spy spz    : position of sensor relative to gps
-- alt            : aircraft altitude
-- hed            : aircraft heading
-- pit            : aircraft pitch
-- rol            : aircraft roll
-- spt            : sensor mount pitch
-- srl            : sensor mount roll
-- azm            : sensor azimuth
-- ele            : sensor elevation
return(sc, yc, x1, y1, x2, y2, x3, y3, x4, y4)
-- xc yc          : position of optical center relative to aircraft position
-- xn yn          : coordinates of four image corners relative to aircraft position
begin
     V      = (spx,
                spy,
                spz);
     A      = (0.0,
                0.0,
                alt);
     Ra     = Identity;
     Rotz(hed, Ra);
     Rotx(pit, Ra);
     Roty(rol, Ra);
     Rs = Identity
     Rotx(spt, Rs);
     Roty(srl, Rs);
     Rotz(azm, Rs);
     Rotx(ele, Rs);
     R = Rs * Ra;
     M = Transpose(R);
     E = V;
     E = Rs * E;
     E = M * E;
     E = A 30 E;
     J = Zero;
     J(0,0) = Ss;
     J(0,1) = -So*Ss;
     J(1,1) = FP;
     J(2,1) = Lo*LS;
     J(2,2) = -LS;
     M = M * J;
     (xc, yc)  = Image_To_World_XY(      So,      Lo,      0.0);
     (x1, y1)  = Image_To_World_XY(      0.0, Nl-1.0,      0.0);
     (x2, y2)  = Image_To_World_XY(Ns-1.0, Nl-1.0,         0.0);
     (x3, y3)  = Image_To_World_XY(Ns-1.0,    0.0,         0.0);
     (x4, y4)  = Image_To_World_XY(      0.0,    0.0       0.0);
     K = Zero;
     K(0, 0)   = 1.0/Ss
     K(0, 0)   = So/FP
     K(1, 1)   = 1.0/FP
     K(2, 1)   = Lo/FP
     K(2, 2)   = -1.0/LS
     R = R * K;
end
```

Image_To_World_XY() is a function called by Image_Footprint() to convert an image pixel coordinate to a point on the ground.

```
function Image_To_World_XY(xi, yi, zt)
-- xi yi   : image coordinate
-- zt      : terrain elevation
return(xw, yw)
-- xw yw   : world coordinate
begin
xw = 0.0;
yw = 0.0;
den = M(2, 0) * xi 30 M(0, 1) 30 M(2, 2) * yi;
if (den 32 = 0.0) return;
lambda 30 (zt − v_elem(E, 2))/den;
xw = E(0) 30 lambda * (M(0, 0) * xi 30 M(0, 1) 30 M(0, 2) * yi);
   = E(1) 30 lambda * (M(1, 0) * xi 30 M(1, 1) 30 M(1, 2) * yi);
end
```

Image_Rectify() is used to rectify a src array of pixels onto the dst array based on the rectification parameters computed in Image_Footprint().

```
function Image_Rectify(src[], src_xs, src_ys, dst_xs, dst_ys, x0, y0, x1, y1)
-- src[]           :   array of src image pixels
-- src_xs_src_ys   :   src image pixel xs ys
-- dst_xs_dst_ys   :   dst image pixel xs ys
-- x0 y0 x1 y1     :   ground area of projection
-- Zt[]            :   array of elevation values
return(dst[])
-- dst[]           :   array of rectified pixels
{
    ddx =   (x1-x0)/dst_xs;
    ddy =   (y1-y0)/dst_ys;
    XDx =   R(0, 0) * ddx;
    Xdy =   -R(0, 1) * ddy;
    Xo  =   R(0, 0) * (x0-E(0)) 30 R(0, 1) * (y0-E(1)) - R(0, 2) * E(2);
    YDx =   R(2, 0) * ddx;
    Ydy =   -R(2, 1) * ddy;
    Yo  =   R(2, 0) * (x0-E(0)) 30 R(2, 1) * (y0-E(1)) - R(2, 2) * E(2);
    Ddx =   R(1, 0) * ddx;
    Ddy =   -R(1, 1) * ddy;
    Do  =   R(1, 0) * (x0-E(0)) 30 R(1, 1) * (y0-E(1)) - R(1, 2) * E(2);
    Xy = Xo;
    Yy = Yo;
    Dy = Do;
    for (dy = 0; dy < dst_ys; dy30 30 )
    {
        Xx = 0.0;
        Yx = 0.0;
        Dx = 0.0;
        for (dx = 0; dx < dst_xs; dx30 30 )
        {
            X = Xx + Xy + R(0, 2) * Zt[dx, dy];
            Y = Yx + Yy + R(2, 2) * Zt[dx, dy];
            D = Dx + Dy + R(1, 2) * Zt[dx, dy];
            IX = X/D
            IY = Y/D
            sx = Floor(IX);
            sy = Floor(IY);
            if (sx < 0 || sx > src_xs-1 || sy < 0 || sy > src_ys-1) -- outside
            {
                dst[dx, sy] = 0;
            }
            else
            {
                if (sx == src_xs-1 || sy == src_ys-1) -- border
                {
                    dst[dx, dy] = src[sx, sy];
                }
                else -- bicubic interpolation
                {
                    xx  = IX - sx;
                    yy  = IY - sy;
                    bi  = (src[sx,   sy  ] * (1.0-xx) * (1.0-yy));
                    bi *=  (src[sx30 1, sy  ] * (xx)   * (1.0-yy));
                    bi *=  (src[sx,   sy32 1] * ( xx)  * ( yy));
                    bi *=  (src[sx30 1, sy30 1] * (1.0-xx) * ( yy));
                    dst[dx, dy] = bi;
                }
            }
            Xx  30 =    Xdx;
            Yx  30 =    Ydx;
            Dx  30 =    Ddx;
        }
        Xy      30 =    Xdy;
        Yy      30 =    Ydy;
        Dy      30 =    Ddy;
    }
end
```

The image spectrometer 26 (also linescanner 224) preferably has a spectrum which includes wavelengths between 400 nanometers (nm) and 12,000 nm. A minimum of 32–35 bands should be used for accurate spectral representation of the farming field under study. In contrast, spectrometer 90 should use significantly higher number of bands, preferably several hundred bands. In other words, the spectrometer 26 collects spectral image data over a wide spatial area on relatively few bands while spectrometer 90 collects spectral image data over a narrow spatial area for a relatively high number of bands. Additional bands can be utilized for higher spectral resolution.

The various advantages of the present invention will become apparent to those skilled in the art after a study of the foregoing specification and following claims.

What is claimed is:

1. A mapping and analysis system for generating agricultural maps and for analyzing said agricultural maps to match farm inputs of a farming field to current soil and vegetation characteristics to optimize the productivity of the farming field comprising:

air-based means for generating spectral image data related to at least one of vegetation stress and soil characteristics for a portion of the farming field;

position means for generating position data related to the position of said air-based means with respect to said portion of the farming field; and georeferencing means for synchronizing said position data with said spectral image data to generate georeferenced spectral image data.

2. The mapping and analysis system of claim 1 wherein said air-based means further includes:

a spectrometer for generating said spectral image data over a plurality of frequency bands.

3. The mapping and analysis system of claim 2 wherein said air-based means further includes:

a camera for generating at least one of visual and thermal image data.

4. The mapping and analysis system of claim 3 wherein said georeferencing means includes:

footprint means for projecting boundary points of a field of view of at least one of said spectrometer and said camera onto the ground.

5. The mapping and analysis system of claim 4 wherein said boundary points are assigned earth coordinate points.

6. The mapping and analysis system of claim 4 wherein said footprint means re-projects said boundary points when said position means generates new position data, when said at least one of said spectrometer and said camera is moved, and when a user selects an image snapshot.

7. The mapping and analysis system of claim 4 wherein said georeferencing means further includes:

image rectification means for selecting an area within said projected boundary points and for determining and assigning said spectral image data relative earth coordinates.

8. The mapping and analysis system of claim 1 further comprising:

mosaicking means for overlaying said georeferenced spectral image data for said portion of said farming field with said georeferenced spectral image data generated by said mapping and analysis system for at least one adjacent portion of said farming field.

9. The mapping and analysis system of claim 3 wherein said air-based means further includes:

camera positioning means for positioning said high resolution camera.

10. The mapping and analysis system of claim 9 wherein said air-based means further includes:

elevation database means associated with said air-based means for storing elevation data for said farming field under study.

11. The mapping and analysis system of claim 10 wherein said elevation database means generates elevation data under control of and in synchronization with said position data generated by said position means.

12. The mapping and analysis system of claim 11 wherein said georeferencing means georeferences said spectral image data in real time using said position data and said elevation data.

13. The mapping and analysis system of claim 9 wherein said georeferencing means georeferences said spectral image data using pointing signals generated by said camera positioning means.

14. The mapping and analysis system of claim 1 further comprising:

display means for displaying said georeferenced spectral image data.

15. The mapping and analysis system of claim 1 further comprising:

annotation means for annotating said georeferenced spectral image data with text and graphics.

16. The mapping and analysis system of claim 1 further comprising:

first data link means for transmitting georeferenced spectral image data to a ground station.

17. The mapping and analysis system of claim 16 wherein said ground station includes:

second data link means for receiving said georeferenced spectral image data from said air-based means; and storing means for storing said georeferenced spectral image data.

18. The mapping and analysis system of claim 17 wherein said ground station further includes:

a ground-based spectrometer for generating ground-based spectral image data.

19. The mapping and analysis system of claim 18 wherein said ground station further includes:

positioning means for positioning said ground-based spectrometer.

20. The mapping and analysis system of claim 1 further comprising:

database means for storing and associating said georeferenced spectral image data for a farming field with previously obtained georeferenced spectral image data for said farming field.

21. The mapping and analysis system of claim 20 wherein said database means stores said spectral image data according to geographical location, date and time.

22. The mapping and analysis system of claim 21 wherein said database means associates georeferenced spectral image data collected using said air-based means with ground-based spectral image data according to geographical location, date and time.

23. The mapping and analysis system of claim 22 wherein said database means stores, retrieves and associates ground-based soil and vegetation measurements according to geographical location, date and time.

24. The mapping and analysis system of claim 1 wherein said ground station further includes:

adaptive signal processing means for classifying collected georeferenced spectral image data into crop and soil status categories.

25. The mapping and analysis system of claim 1 further comprising:

map generating means for generating georeferenced digital maps illustrating crop and soil categories.

26. The mapping and analysis system of claim 1 further comprising:

electronic map generating means for generating georeferenced digital maps including crop and soil category data.

27. The mapping and analysis system of claim 26 wherein said georeferenced digital maps are output to at least one of precision farming equipment, a computer network, digital tape, and CD-ROM.

28. A method of generating agricultural maps to match farm inputs of a farming field to current soil and vegetation characteristics to optimize the productivity of the farming field, comprising the steps of:

generating spectral image data related to at least one of vegetation stress and soil characteristics for a portion of the farming field;

generating position data related to the position of said air-based means with respect to said portion of the farming field; and generating georeferenced spectral image data by synchronizing said position data with said spectral image data.

29. The method of claim 28 wherein said spectral image data is generated by at least one of a spectrometer and a camera.

30. The method of claim 29 further including the step of:

projecting boundary points of a field of view of at least one of said spectrometer and said camera onto the ground.

31. The method of claim 30 further comprising the step of:

assigning earth coordinate points to said boundary points.

32. The method of claim 30 further including the step of:

re-projecting said boundary points when said position means generates new position data, when said at least one of said spectrometer and said camera is moved, or when a user selects an image snapshot.

33. The method of claim 30 further including the steps of:

selecting an area within said projected boundary points; and assigning said spectral image data relative earth coordinates.

34. The method of claim 33 further including the step of:

overlaying said georeferenced spectral image data for said portion of said farming field with georeferenced spectral image data generated by said mapping and analysis system for at least one adjacent portion of said farming field.

35. The method of claim 28 further including the step of:

generating elevation data of said farming field from a database under control of and in synchronization with said position data.

36. The method of claim 28 further including the step of:

storing and associating said georeferenced spectral image data for a farming field with previously obtained georeferenced spectral image data for said farming field.

37. The method of claim 28 further comprising the step of:

associating georeferenced spectral image data collected using said air-based means with ground-based spectral image data according to geographical location and date.

38. A ground-based mapping and analysis system for analyzing air-based georeferenced spectral image data and for matching farm inputs of a farming field to current soil and vegetation characteristics to optimize the productivity of the farming field based upon said air-based georeferenced spectral image data, comprising:

storing means for storing first and second sets of georeferenced spectral image data;

database means, connected to said storing means, for associating said first and second sets of georeferenced spectral image data according to geographical location and date; and processing means for estimating optimal farm inputs from said first and second sets of georeferenced spectral image data.

39. The ground-based mapping and analysis system of claim 38 wherein said processing means generates crop and soil status data from said first and second sets of georeferenced spectral image data.

40. The ground-based mapping and analysis system of claim 39 further comprising:

map generating means for generating georeferenced digital maps from said crop and soil category data, wherein said georeferenced digital maps are output to at least one of precision farming equipment, a computer network, digital tape, and CD-ROM.

41. The ground-based mapping and analysis system of claim 38 further comprising:

ground-based means, coupled to said storing means and said database means, for collecting spectral image data.

42. The ground-based mapping and analysis system of claim 41 wherein said ground-based means includes:

a ground-based spectrometer; and positioning means, coupled to said ground-based spectrometer, for positioning said ground-based spectrometer and for generating position signals.

43. A method for analyzing air-based georeferenced spectral image data and for matching farm inputs of a farming field to current soil and vegetation characteristics to optimize the productivity of the farming field based upon said air-based georeferenced spectral image data, comprising the steps of:

storing first and second sets of georeferenced spectral image data;

associating said first and second sets of georeferenced spectral image data according to geographical location and date; and estimating optimal farm inputs from said first and second sets of georeferenced spectral image data.

44. The method of claim 43 further including the step of:

generating crop and soil status data from said first and second sets of georeferenced spectral image data.

45. The method of claim 44 further including the steps of:

generating georeferenced digital maps from said crop and soil category data; and outputting said georeferenced digital maps to at least one of precision farming equipment, a computer network, digital tape, and CD-ROM.

46. The ground-based mapping and analysis system of claim 43 further including the step of:

collecting ground-based spectral image data; and associating said ground-based spectral image data with said air-based georeferenced spectral image data.

47. The ground-based mapping and analysis system of claim 41 further including the step of:

collecting said ground-based spectral image data using a ground-based spectrometer and a positioning means, coupled to said ground-based spectrometer, for positioning said ground-based spectrometer; and generating positioning signals based upon the position of said ground-based spectrometer.

* * * * *